United States Patent [19]

Anthenien et al.

[11] 3,951,895

[45] Apr. 20, 1976

[54] ASPHALTIC COMPOUND AND PROCESS FOR MAKING THE SAME

[76] Inventors: Conrad A. Anthenien, 4404 Roselle, Modesto, Calif. 95350; Mark C. Anthenien, 780 Saratoga Ave., No. S-313, San Jose, Calif. 95129; Dale C. Anthenien, 4404 Roselle, Modesto, Calif. 95350

[22] Filed: July 24, 1975

[21] Appl. No.: 598,556

[52] U.S. Cl. ...................... 260/28.5 AS; 260/42.52
[51] Int. Cl.² ............................................. C08L 95/00
[58] Field of Search ................ 260/28.5 R, 28.5 AS

[56] References Cited
UNITED STATES PATENTS

| | | | |
|---|---|---|---|
| 3,316,200 | 4/1967 | Hatala | 260/28.5 R X |
| 3,778,397 | 12/1973 | Gannon et al. | 260/28.5 R |
| 3,849,355 | 11/1974 | Yamaguchi et al. | 260/28.5 R X |

*Primary Examiner*—Lewis T. Jacobs
*Attorney, Agent, or Firm*—Bruce H. Johnsonbaugh

[57] ABSTRACT

A process of making an asphaltic compound for use in paving and roofing in the field at ambient air temperatures is disclosed in which 1–5 parts by weight of an acrylic emulsion of a copolymer of methyl methacrylate and ethyl acrylate is mixed with 1–3 parts by weight of hydrated lime and with 40 parts by weight of clean washed sand and thereafter blended at ambient air temperatures with 12–20 parts by weight of asphaltic emulsion.

5 Claims, No Drawings

ASPHALTIC COMPOUND AND PROCESS FOR MAKING THE SAME

This invention relates generally to the manufacture of asphaltic compounds and, more specifically, to the formulation of an improved asphaltic compound which may be manufactured in the field without the necessity of applying heat, i.e., the compound may be manufactured at ambient air temperatures.

The invention also relates to an improved asphaltic composition which is particularly useful for patching and/or repaving deteriorated asphalt surfaces.

It is known in the prior art to combine asphaltic materials with copolymers containing methyl acrylate. For example, the Smith et al. U.S. Pat. No. 3,629,164 teaches the combination of propane-precipitated asphalt with an ethylene-lower alkyl acrylate copolymer. This patent teaches that the mixing occur at elevated temperatures using the specific propane-precipitated asphalt. The end product is foam used in insulation or in floatation equipment.

The instant invention provides a very simple process of manufacturing an improved asphaltic composition for paving and roofing. The improved asphaltic composition can be manufactured readily on the job site at ambient air temperatures and is ready to be applied immediately after mixing the compound for about one-half hour.

A primary object of the instant invention is to provide a process of manufacturing an improved asphaltic compound which may be carried out at ambient air temperatures with a very fast reaction time.

A further object of this invention is to provide a process of manufacturing an improved asphaltic compound for use in patching and/or repaving deteriorated asphalt surfaces.

A still further object of this invention is to provide an improved asphaltic compound which may be utilized in roofing material as well as a paving material In the following examples, the asphaltic emulsion used is the standard SS1h emulsion. The SS1h emulsion is a slow set, grade 1, hard grade (60–70) base asphalt, with a pentration of about 100.

The acrylic emulsion is a copolymer of methyl methacrylate and ethyl acrylate, manufactured by Rohm and Haas Company and sold under the tradename Rhoplex AC-234. The characteristics of the emulsion are as follows:

| | |
|---|---|
| Appearance | White milky liquid |
| Solids content | 46 to 47% |
| pH (as shipped) | 9.5 to 10.0 |
| Density | 8.9 lbs. per gallon |
| Specific gravity of solids | 1.15 |
| Viscosity, 25°C. | 100 to 2000 cps. |

EXAMPLE

Twenty-five pounds of acrylic emulsion were mixed with 12½ pounds of hydrated lime and stirred at approximately 75°F. for approximately 10 minutes. To the mixture, 200 pounds of asphalt emulsion were added and the mixture was stirred for approximately 20 minutes in a mixer having rotating paddles running at 13 RPM. Five hundred pounds of clean wash sand were added to the mixture and mixed for 10 minutes. The resultant mixture was applied immediately to the deteriorated surface of an asphalt-paved parking lot. The mixture seeped into the cracks of the deteriorated surface of the parking lot, and formed a suitable paved surface with added flexibility and water resistance as compared to the pre-existing surface. It was not necessary to remove, as by jackhammering, any of the asphalt of the pre-existing, deteriorated surface.

With 500 pounds of clean wash sand, we have used approximately 12 to 65 pounds of acrylic emulsion, 0 to 40 pounds of hydrated lime and 150 to 250 pounds of SS1h emulsion and have obtained an asphaltic composition with improved qualities for paving and roofing. The example given above outlines the preferred ratio of the components.

The applicants have not had access to standard asphalt test equipment and are unable to state precisely the resultant penetration, toughness-tenacity or the precise softening point of the asphaltic compositions. The mixtures identified above were applied successfully to deteriorated asphalt surfaces and produced a very durable, water-resistant surface of somewhat more flexibility than the previous surface; and also have been applied successfully as roofing material.

We claim:

1. A process of manufacturing an asphaltic compound in the field comprising the steps:

mixing at ambient air temperature, one to five parts by weight of an emulsion of a copolymer of methyl methacrylate and ethyl acrylate have 40% to 60% solids by weight with 12 to 20 parts by weight of asphaltic emulsion.

2. The process of claim 1 further comprising the step of mixing at ambient air temperature with said emulsion of a copolymer of methyl methacrylate and ethyl acrylate one to three parts by weight of hydrated lime.

3. The process of claim 2 further comprising the final step of mixing at ambient air temperature 40 parts by weight of clean wash sand with the mixture.

4. An asphaltic composition comprising the admixture of:

one to five parts by weight of an emulsion of a copolymer of methyl methacrylate and ethyl acrylate having 40% to 60% solids by weight and 12 to 20 parts by weight of asphaltic emulsion.

5. The composition of claim 4 further comprising one to three parts by weight of hydrated lime.

* * * * *